United States Patent
Danielsson et al.

(10) Patent No.: US 6,596,166 B1
(45) Date of Patent: Jul. 22, 2003

(54) APPARATUS FOR CLEANING A FILTER CLOTH IN A FILTERING DEVICE

(75) Inventors: Åke Danielsson, Skanör (SE); Åke Ralvert, Hässleholm (SE)

(73) Assignee: Hydrotech Nils-Ake Persson AB, Vellinge (SE)

( * ) Notice: Subject to any disclaimer, the term of this patent is extended or adjusted under 35 U.S.C. 154(b) by 0 days.

(21) Appl. No.: 09/868,595
(22) PCT Filed: Dec. 20, 1999
(86) PCT No.: PCT/SE99/02428
§ 371 (c)(1), (2), (4) Date: Sep. 24, 2001
(87) PCT Pub. No.: WO00/37159
PCT Pub. Date: Jun. 29, 2000

(30) Foreign Application Priority Data

Dec. 22, 1998 (SE) ............................................. 9804461

(51) Int. Cl.⁷ ..................... B01D 33/06; B01D 33/50; B01D 33/21
(52) U.S. Cl. ................. 210/324; 210/327; 210/330; 210/333.01; 210/391; 210/403
(58) Field of Search ................................ 210/324, 327, 210/330, 331, 333.01, 391, 394, 403

(56) References Cited

U.S. PATENT DOCUMENTS

| | | | |
|---|---|---|---|
| 3,521,751 A | * | 7/1970 | Holthuis .................... 210/797 |
| 4,975,189 A | | 12/1990 | Liszka |
| 5,149,448 A | | 9/1992 | Mattelmaki |
| 5,632,907 A | * | 5/1997 | Norbury ..................... 210/787 |
| 5,759,397 A | * | 6/1998 | Larsson et al. ............. 210/331 |
| 5,900,158 A | * | 5/1999 | Ruokolainen et al. ...... 210/772 |
| 6,063,294 A | * | 5/2000 | Martensson et al. ........ 210/739 |
| 6,461,507 B1 | * | 10/2002 | Ishigaki et al. ........ 210/330.01 |

FOREIGN PATENT DOCUMENTS

| | | |
|---|---|---|
| WO | WO 93/23140 | 11/1993 |
| WO | WO 94/23821 | 10/1994 |

OTHER PUBLICATIONS

Skivfilter, dated Mar., 1996. Hydrotech No Translation.
Discfilter, dated Mar., 1996. Hydrotech.
Trumfilter, dated Jul., 1996. Hydrotech No Translation.
Drumfilter, dated Jul., 1996 Hydrotech.

* cited by examiner

Primary Examiner—Fred Prince
(74) Attorney, Agent, or Firm—Finnegan, Henderson, Farabow, Garrett, & Dunner, L.L.P.

(57) ABSTRACT

Apparatus for cleaning a filter cloth in a filtering device with a rotatable drum having an inlet for the liquid to be filtered. The drum has in its circumferential surface openings through which the liquid to be filtered is conducted in a filtering direction out of the drum for filtering through a filter cloth. The cleaning apparatus includes at least one spray nozzle which is adapted to spray cleaning liquid onto a portion of the filter cloth in a direction opposite to the filtering direction. Moreover the apparatus comprises a driving device for providing a reciprocating motion of the spray nozzle. The driving device has a coupling which is adapted to transform the rotary motion of the drum into the reciprocating motion of the spray nozzle, with such a ratio that the rotary motion of the drum and the reciprocating motion of the spray nozzle are out of phase with each other.

16 Claims, 4 Drawing Sheets

PRIOR-ART TECHNIQUE

PRIOR-ART TECHNIQUE

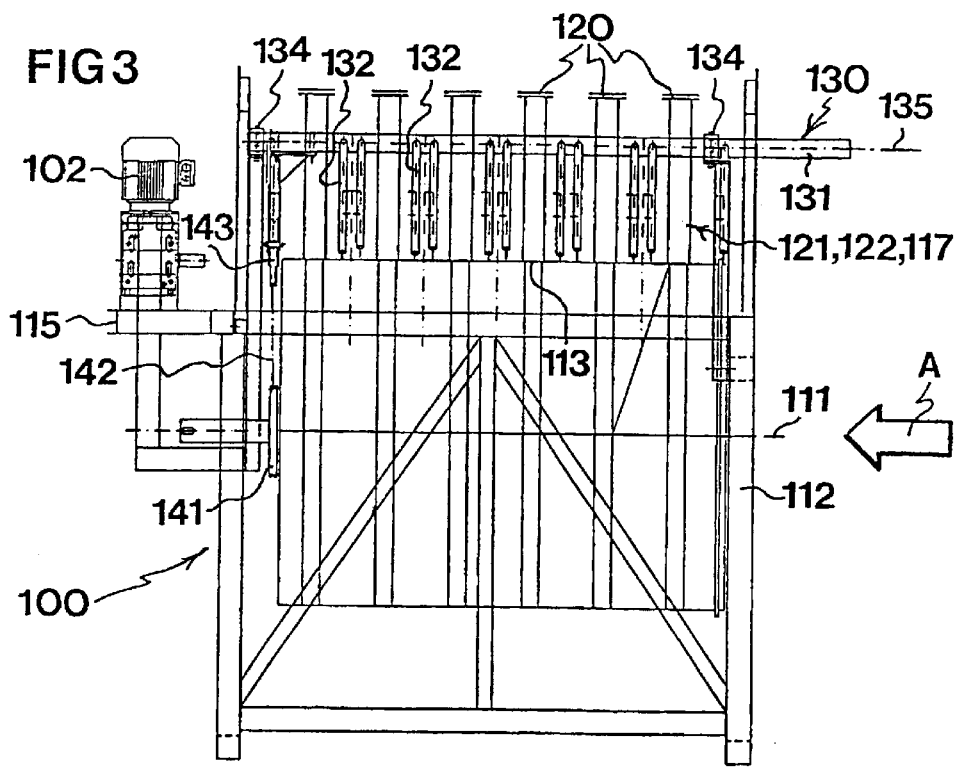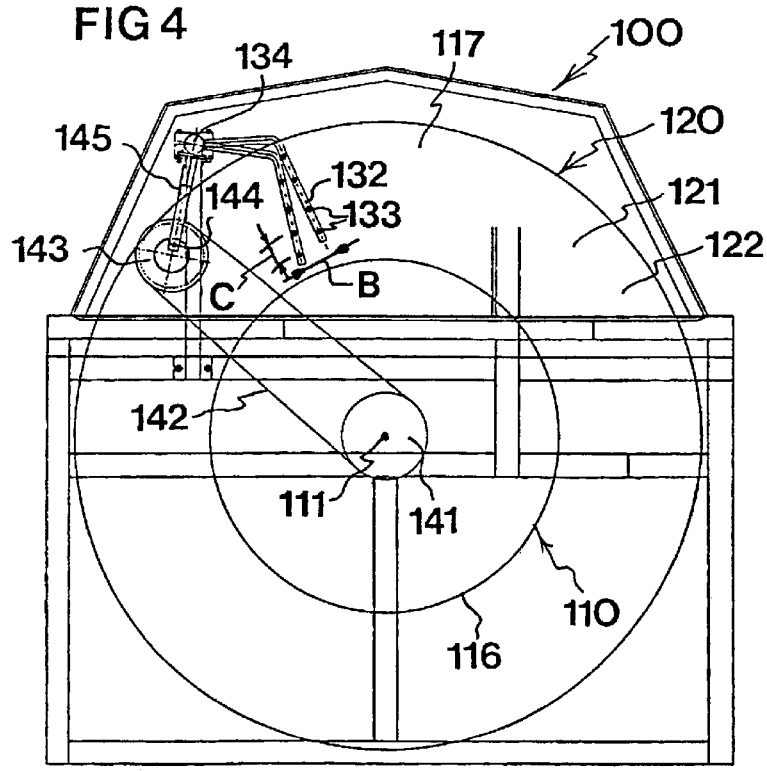

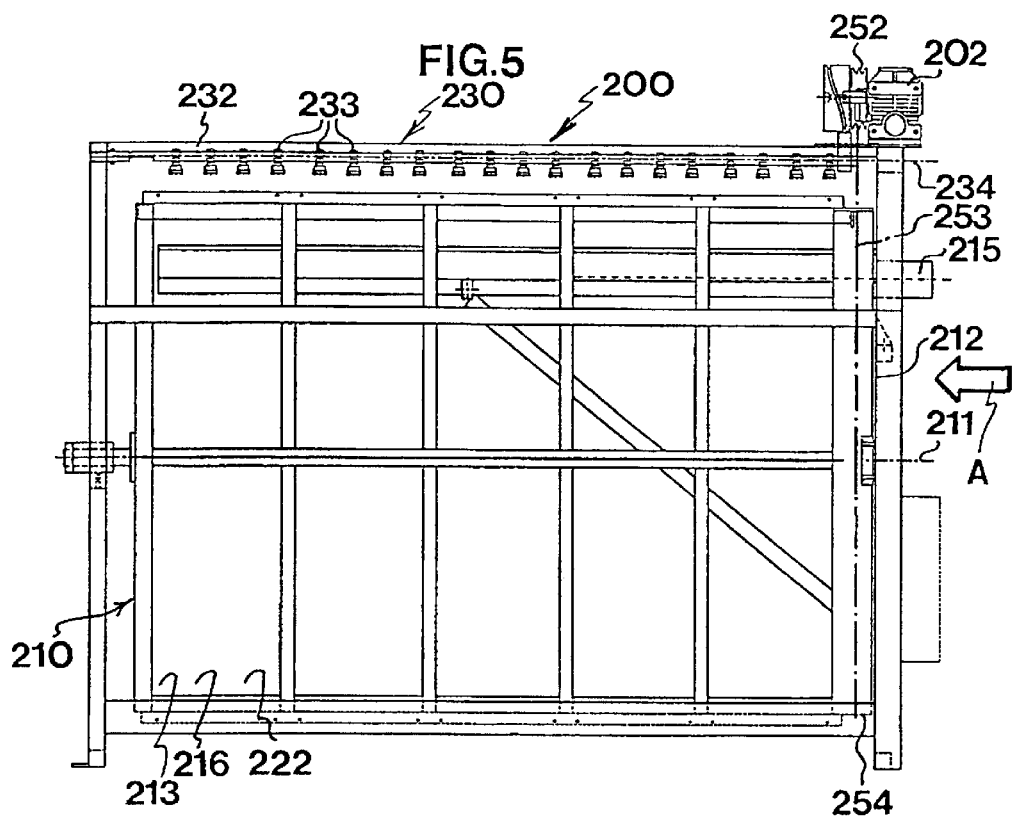
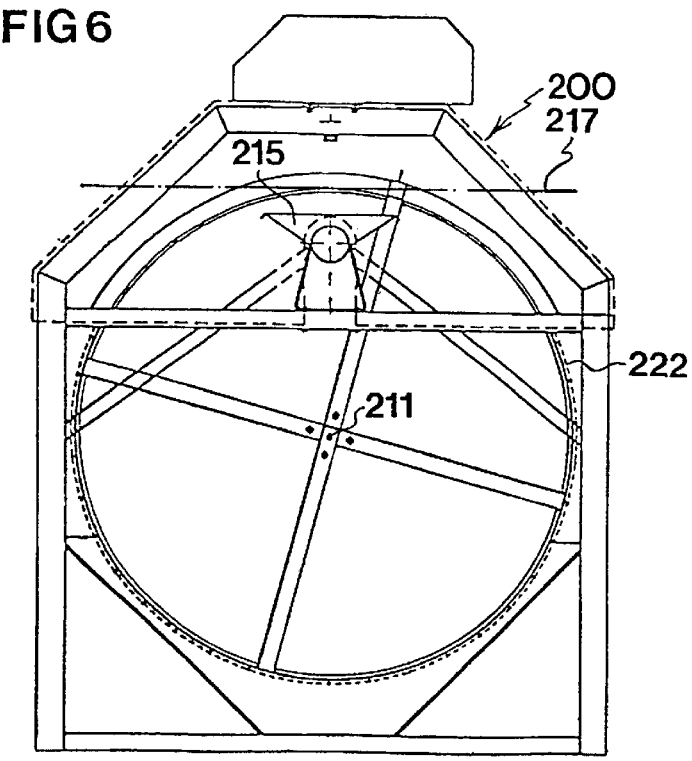

APPARATUS FOR CLEANING A FILTER CLOTH IN A FILTERING DEVICE

FIELD OF THE INVENTION

The present invention relates to an apparatus for cleaning a filter cloth in a filtering device.

BACKGROUND ART

Filtering devices of the type stated by way of introduction are used especially for filtering of particles from liquids.

Two variants of filtering devices of this type are predominant on the market.

The one variant is in technical language called rotary disc filter and is described, for example, in the brochure "Skivfilter" (in English: Rotary Disc Filter) issued by the Applicant (Hydrotech, 1996). The brochure, p. 2, shows in a perspective view the principle of such a rotary disc filter, see FIG. 1. The rotary disc filter 10 comprises a horizontal, slowly rotating drum 11, which supports a number of parallel, disc-shaped filter elements 12 which are successively arranged in spaced-apart relationship along the centre axis of the drum and which extend radially away from the drum 11. The filter elements 12 have on their opposite lateral surfaces relatively large openings which are covered with a filter cloth 13. The drum 11 has a number of openings through which the liquid A which is to be filtered can flow to the interior of the filter elements 12. The filtering liquid A is conducted through an inlet into the drum 11 and then falls down to the interior of the disc-shaped elements 12, from which the liquid A continues out through the filter cloth 13 so that the particles which are to be fiitered off adhere to the inside of the filter cloth 13. For cleaning of the filter cloth 13, the disc filter 10 is provided with spray nozzles 14 which are mounted on a number of fixed flush tubes 15, which extend between the disc-shaped filter elements 12. The flush tubes 15 are adapted to conduct flushing liquid to the spray nozzles 14 and are connected to an elongate liquid-conducting pipe 16 which extends parallel with the centre axis of the drum 11. The spray nozzles 14 spray the filter cloth 13 axially from the outside, in a direction opposite to the filtering direction, and the flushed-away particles are collected in a discharge trough 17 which is placed inside the drum 11 in the upper portion thereof.

The other variant is in technical language called drum filter and described, for example, in the brochure "Trumfilter" (in English: Drum Filter) issued by the Applicant (Hydrotech, 1996). The brochure, p. 2, shows in a perspective view the principle of such a drum filter. See FIG. 2 where the drum 21 has been cut open to be able to show the flushing equipment arranged outside the drum 21. Thus the drum filter 20 comprises a horizontal, slowly rotating drum 21, whose circumferential surface has relatively large openings which are covered with a filter cloth 22. The liquid A that is to be filtered is passed into the drum 21 and is filtered as it falls downwards through the filter cloth 22 and out of the drum 21. To avoid clogging of the filter cloth 22 on the rotating drum 21, this is flushed clean with the aid of fixedly mounted spray nozzles 23 which are placed on the outside of the drum 21 and above the liquid level inside the drum 21. The flushing is carried out radially inwards in a direction opposite to the filtering direction. The dirt which is flushed away from the cloth 22 inwards in the drum 21 reaches a discharge trough 24 which is placed inside the drum 21 just above its centre axis and which draws off the dirt.

The reverse flushing or cleaning can in both cases occur with a rotating or stationary drum, and the flushing may occur continuously or intermittently.

A problem which is common to these filtering devices is that the filter cloth has a tendency to clog in spite of the particular spray nozzles which flush the filter cloth in a direction opposite to the filtering direction. Clogging of the filter cloth deteriorates the efficiency or degree of efficiency of the filtering device.

Moreover the filter cloth of both variants has a tendency to be "striped" owing to irregular cleaning, which is a sign of the filter cloth not being sufficiently cleaned in certain portions.

The above drawbacks in turn result in the filter cloth needing be replaced too frequently.

For satisfactory cleaning of the filter cloth, a plurality of spray nozzles must according to the prior art solutions be arranged extremely close together, which means that the filtering device is rendered expensive.

SUMMARY OF THE INVENTION

An object of the present invention is suggest a solution to the above problems by providing an improved apparatus for cleaning a filter cloth in a filtering device.

The cleaning apparatus according to the invention comprises a driving device for providing a reciprocating motion of the spray nozzles. The reciprocating motion allows each spray nozzle to clean a larger portion of the filter cloth, which results in more efficient cleaning. Besides, the number of spray nozzles can be reduced.

The driving device has a coupling which is adapted to transform the rotary motion of the drum into the reciprocating motion of the spray nozzles. The coupling has such a gear ratio that the rotary motion of the drum and the reciprocating motion of the spray nozzles are out of phase with each other. By these two motions not occurring in step or phase with each other, it is avoided that a certain spray nozzle flushes the same parts of the filter cloth revolution after revolution. This means that each portion of the filter cloth is once now and then subjected to direct flushing by a spray nozzle. If the motions had occurred in phase, the above-described "striped" condition of the filter cloth would only have been converted into curved lines instead, thus causing incomplete cleaning.

The reciprocating motion of the spray nozzles preferably has a motion vector component, which is in a plane parallel to that portion of the filter cloth which in a certain rotational position is flushed and which is directed perpendicular to the direction of motion of said filter cloth portion. By the filter cloth moving in one direction and the spray nozzles at least partially moving in a direction perpendicular thereto, all portions of the filter cloth can be reached by a flushing jet from a spray nozzle.

The spray nozzles are advantageously arranged on a flush tube which is adapted to conduct the cleaning liquid to all spray nozzles. This solution makes the construction compact and robust.

According to a first aspect of the invention, the filtering device further comprises at least one disc-shaped filter element, whose normal direction is parallel and essentially concentric with the centre axis of the drum. The filter element extends radially away from and round the drum. The filter cloth is supported on at least one of the lateral surfaces of the disc-shaped filter element. The cleaning apparatus according to this first aspect advantageously comprises a flushing, ramp which is pivotable about a pivot axis, which is parallel with the centre axis of the drum. The pivotability of the flushing ramp gives the spray nozzles a reciprocating rocking motion, which results in more efficient cleaning of the filter cloth and, thus, an improved degree of efficiency of the filtering device.

According to a preferred embodiment of this aspect, the flushing ramp has flush tubes each supporting at least one spray nozzle. The flush tubes are intended to conduct the cleaning liquid to the spray nozzles. Thanks to the rocking motion of the flushing ramp, a spray nozzle supported on a flush tube is given a reciprocating motion on the one hand in the radial direction and, on the other hand, in the tangential direction, thus allowing all portions of the filter cloth to be reached by a spray nozzle.

For utilisation of the limited space between the disc-shaped elements, the flush tube is preferably arranged in a plane which is essentially parallel with the lateral surface of the filter element.

The flush tube has such a radial extent as to extend along essentially the entire portion of the lateral surface of the disc-shaped element which is provided with filter cloth. This allows all portions of the filter cloth to be reached by a spray nozzle supported on the flush tube, without the flush tube having to make a great and inconvenient motion.

According to a preferred embodiment of the invention in its first aspect, said coupling between the rotary motion of the drum and the reciprocating motion of the spray nozzle is provided by means of a loop-shaped drive between an eccentrically mounted wheel connected to the flushing ramp and a wheel non-rotationally mounted on the rotary shaft of the drum. Since the loop-shaped drive has an essentially constant length and the wheel connected to the flushing ramp is eccentrically mounted, the flushing ramp is forced to make said reciprocating rocking pivoting motion.

To ensure that the rotary motion of the drum and the reciprocating motion of the flushing are out of phase, the wheels have an uneven, ratio-generating ratio of diameters. For example, the two diameter dimensions can be non-divisible by each other.

According to a second aspect of the invention, the filter cloth is supported on the circumferential surface of the drum, at least one spray nozzle being arranged on an elongate flushing ramp with an elongate flush tube which is intended to conduct cleaning liquid to the spray nozzles and which is arranged essentially parallel with the centre axis of the drum. This solution makes the construction compact and robust.

The flush tube is preferably reciprocable along its longitudinal axis for providing the reciprocating motion of the spray nozzles, which results in more efficient cleaning of the filter cloth and, thus, a higher degree of efficiency of the filtering device.

According to a preferred embodiment of this second aspect, a drive wheel is arranged on a drive shaft which via said coupling rotationally drives the drum. Advantageously the drive wheel has on its circumferential surface a circumferential guide means, and the cleaning apparatus further comprises a follower means connected to the flush tube. To provide the reciprocating motion of the spray nozzles, the follower means engages with and follows the guide means.

The guide, means preferably comprises a wave-shaped groove formed in the circumferential surface of the drive wheel, and the follower means advantageously comprises a pin fixedly connected to the flush tube.

By using a guide means and a follower means, which according to a preferred embodiment consist of a groove and a pin, a motion-transferring coupling is obtained, which is simple, robust and reliable.

To achieve the condition that the rotation of the drum and the reciprocating motion of the flushing ramp are out of phase with each other, the drive shaft supporting the drive wheel is connected to the rotary shaft of the drum with a non-uniform gear ratio. This non-uniform gear ratio causes a spray nozzle not to flush the same portion of the filter cloth revolution after revolution as the drum rotates.

According to a preferred embodiment of one of the two aspects of the invention, the cleaning apparatus comprises at least two spray nozzles, two neighbouring spray nozzles being arranged to spray, in a certain rotational position of the drum, cleaning liquid onto a first and a second portion of the filter cloth. The reciprocating motion of the spray nozzles has a stroke which is at least equal to the distance between said first and second portion of the filter cloth. This stroke causes all portions of the filter cloth to be reached by direct flushing by means of one of the spray nozzles.

BRIEF DESCRIPTION OF THE DRAWINGS

The invention will now be described in more detail with reference to the accompanying schematic drawings which for the purpose of exemplification illustrate currently preferred embodiments of the invention according to its two aspects.

FIG. 3 is a front view of a rotary disc filter provided with a cleaning apparatus according to a first aspect of the invention.

FIG. 4 is an end view of the rotary disc filter shown in FIG. 3.

FIG. 5 is a front view which shows a drum filter provided with a cleaning apparatus according to a second aspect of the filtering device.

FIG. 6 is an end view of a drum filter shown in FIG. 5.

DESCRIPTION OF PREFERRED EMBODIMENTS

Figure 1:
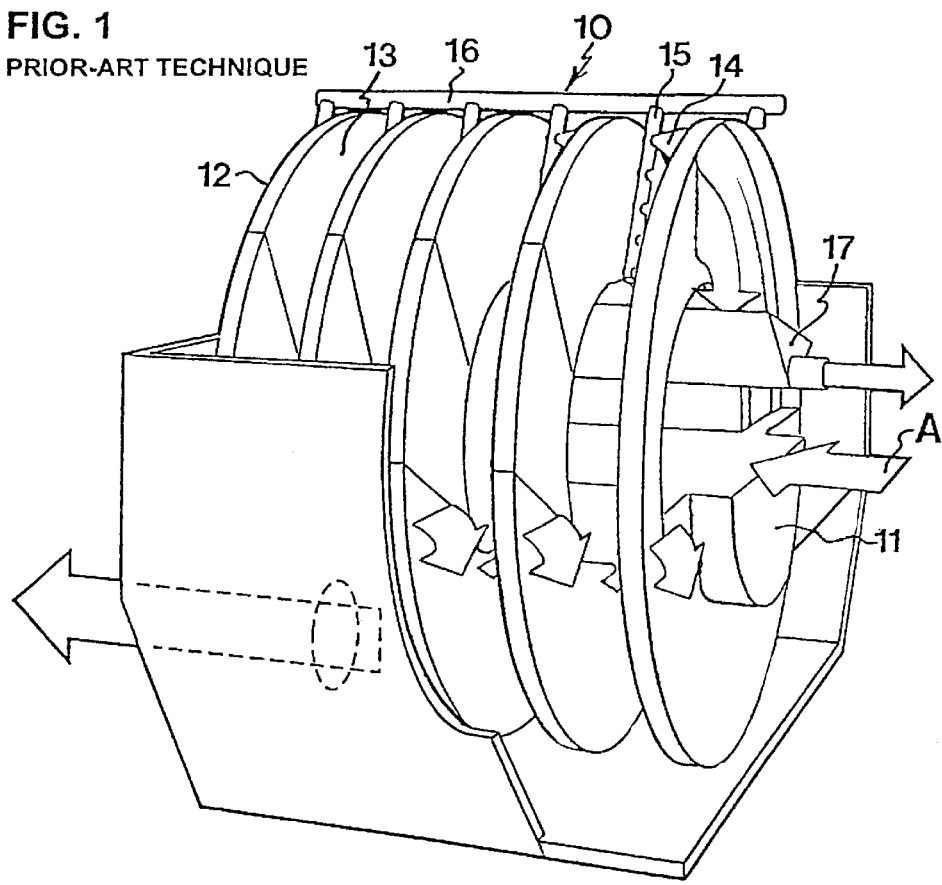
FIG. 1 is a perspective view which schematically illustrates the principle of a prior-art rotary disc filter.

FIGS. 3 and 4 show a filtering device, a so-called rotary disc filter, according to a first aspect of the invention. The essential function of a disc filter of this type is shown in FIG. 1. The disc filter 100 has a slowly rotating drum 110 which supports a number of disc-shaped filter elements 120, whose normal direction is parallel and concentric with the axis of rotation 111 of the drum 110 and which on their lateral surfaces 121, which are axially directed and have a radial extent, support a filter cloth 122. The liquid A which is to be filtered is conducted through an inlet 112 to the interior of the drum 110. From the interior of the drum 110 the filtering liquid is conducted through openings 113 in the circumferential surface 116 of the drum 110 to the interior of the disc-shaped filter elements 120. From there, the filtering liquid A is then finally conducted in a filtering direction out through the filter cloth 122. Any particles in the filtering liquid A adhere to the inside of the filter cloth 122.

If the disc filter 100 is used without cleaning or reverse flushing, more and more particles will be collected on the inside of and in the pores of the filter cloth 122. This would imply that the degree of efficiency of the filter decreases and that it would be necessary to frequently change the filter cloth 122. To avoid that the filter cloth 122 must be changed too frequently, it is flushed intermittently or continuously from the outside in a direction opposite to the filtering direction by means of spray nozzles 133. The particles that are flushed away from the filter cloth 122 are collected and drained off by a discharge trough 115 which is placed inside the drum 110 in the upper portion thereof.

The spray nozzles 133 are fixedly mounted on a number of flush tubes 132 which each, in turn, at their one end are mounted on a flushing ramp 130 which is placed along the disc filter 100 outside the disc-shaped filter elements 120. The flushing ramp 130 comprises an elongate flushing ramp pipe 131 which extends parallel with the centre axis of the drum 10 and which conducts flushing or cleaning liquid to the flush tubes 132, which in turn conduct the cleaning liquid to the spray nozzles 133. The flushing ramp 130 is mounted in a number of suspension bearings 134 so as to be pivotable about its longitudinal axis 135. The flush tubes 132 extend from the flushing ramp 130 radially inwards between the disc-shaped filter elements 120 and in parallel along the entire portion of the lateral surfaces 121 of the filter elements 120 which supports the filter cloth 122.

The disc filter 100 has a motor 102 which drives the rotary motion of the drum 110. The drum 110 has a pulley 141 which is non-rotationally connected to the rotary shaft 111 of the drum and which via a drive belt 142 is connected to another pulley 143, which is eccentrically and freely mounted on a pivot pin 144. The pivot pin 144 is parallel with the centre axis 111 of the drum 110 and is supported at a distance from the flushing ramp 130 by an arm 145 which is mounted on the flushing ramp 130. Since the length of the belt 142 and the diameters of the pulleys 141, 143 do not vary during operation, the position of the pivot pin 144 in relation to the drum 110 must vary, and since the pivot pin 144 is fixedly connected to the flushing ramp 130 via the arm 145, the flushing ramp 130 will be forced to make a reciprocating rocking motion.

By the two pulleys 141, 143 having a ratio-generating ratio of diameters which is non-divisible, a coupling is obtained between the rotary motion of the drum 110 and the rocking motion of the spray nozzles 133 which are not in phase. This causes all portions of the filter cloth 122 to be cleaned once now and then by a jet from a spray nozzle 133. As a result, the filter cloth 122 will not be "striped" owing to non-uniform cleaning, which arises when different portions of the filter cloth 122, revolution after revolution as the drum 110 rotates, are subjected to different degrees of flushing.

The pivoting motion of the flushing ramp 130 about its longitudinal axis 135 makes the flush tubes 132 oscillate in a plane parallel with the lateral surfaces 121 of the filter elements 120. A spray nozzle 132 will make a reciprocating motion and, consequently, flush different portions of the filter cloth 122. Thanks to the suspension of the flush tubes 132 and the flushing ramp 130, the spray nozzles 133 will make a reciprocating motion which has a radial and a tangential component. Since the filter cloth 122 relative to a stationary spray nozzle 133 has a tangential vector of motion, the spray nozzle 133 will make a motion which, relative to the filter cloth 122, at least partially has a radial component. The motion of a spray nozzle 133 should thus, for different portions of the filter cloth to be reached by a spray nozzle, during some part of its motion have an angle relative to the motion described by that portion of the filter cloth 122 which in a certain rotational position is flushed. An angular difference between two vectors of motion means that a first vector of motion at least has one component which is perpendicular to the second vector of motion.

Figure 2:
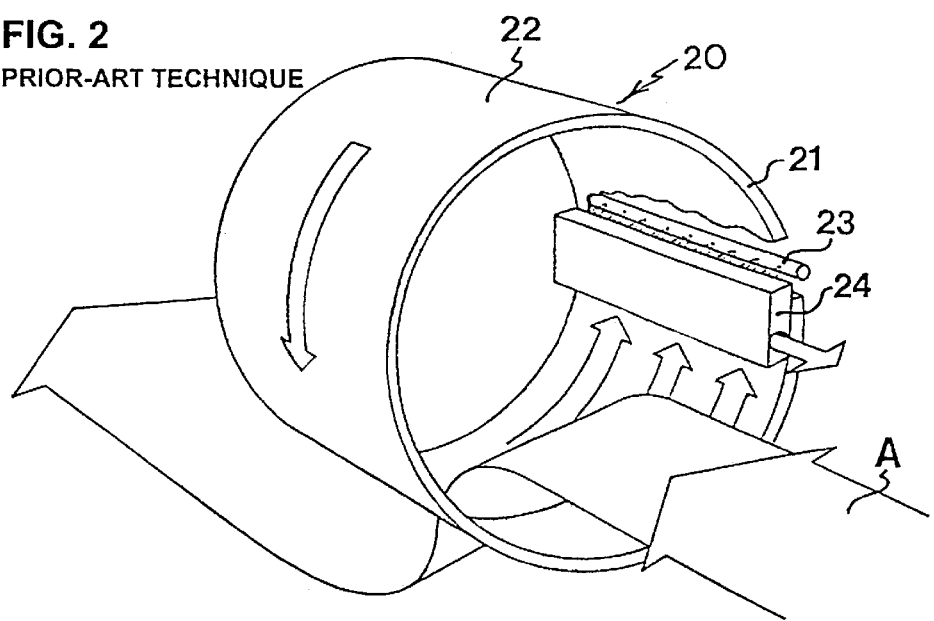
FIG. 2 is a perspective view which schematically illustrates the principle of a prior-art drum filter.

FIGS. 5 and 6 show a filtering device, a so-called drum filter, according to a second aspect of the invention. The essential function of a drum filter of this type is illustrated in FIG. 2. The drum filter 200 comprises mainly a slowly rotating drum 210. The liquid A which is to be filtered is conducted via an inlet 212 into the interior of the drum 210 which in its circumferential surface 216 has openings 213 covered with a filter cloth 222. The filtering liquid A is passed through the openings 213 covered with the filter cloth 222, any particles getting stuck on the inside of the filter cloth 222.

Just like in the case of the disc filter 100, use of the drum filter 200 without cleaning or reverse flushing would mean that gradually more and more particles would collect on the inside of and in the pores of the filter cloth 222, which would result in the degree of efficiency deteriorating. Also for the drum filter 200, reverse flushing occurs by means of spray nozzles 233 which are placed on the outside of the drum 200 so that they flush the filter cloth 222 in a direction opposite to the filtering direction.

What differs the drum filter 200 from the previously described disc filter 100 is that the filter cloth 222 is arranged immediately above the openings 213 in the circumferential surface 216 of the drum 200 instead of being expanded on disc-shaped filter elements 120. This means that the flushing must in terms of construction be designed in a slightly different manner to function in the way that characterises the invention.

Thus, the spray nozzles 233 are fixedly mounted on an elongate flushing ramp 230 directly on an elongate flush tube 232 which is intended to conduct cleaning liquid to the spray nozzles 233 and which is parallel with the rotary shaft 211 of the drum 210. To provide the previously described difference in directions of motion between the spray nozzles 233 and the filter cloth 222, the flush tube 232 is reciprocable along its longitudinal axis 234. As a result, the filter cloth 222 rotating with the drum 210 and, the spray nozzles 233 move in two directions, whose vectors of motion are perpendicular to each other.

Figure 7:
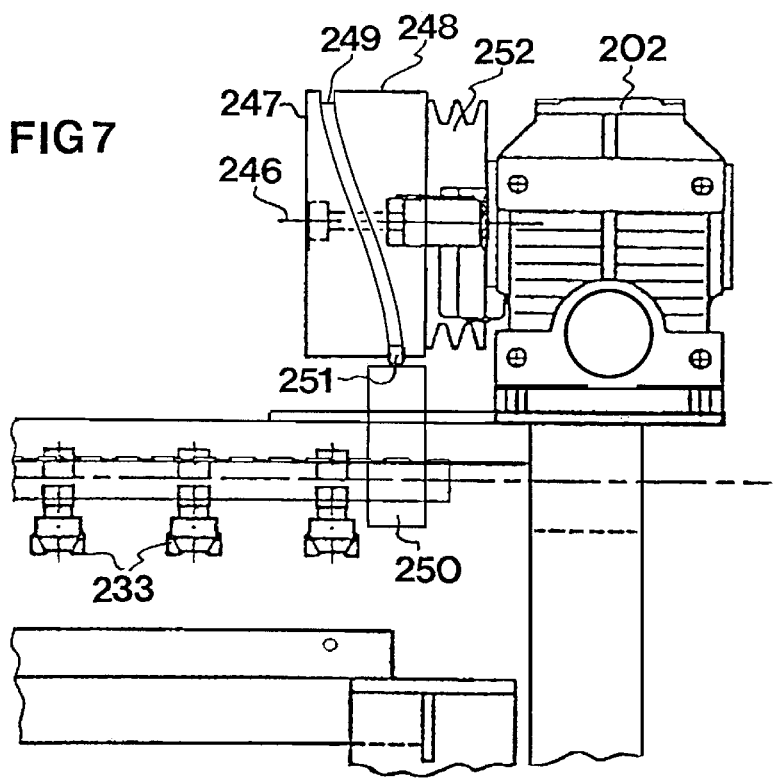
FIG. 7 is a partial view on a larger scale of the drum filter shown in FIG. 5.

As is evident from FIG. 7, the drum filter 200 has a motor 202 which via a belt drive 253 drives the rotary motion of the drum 210. The drive shaft 246 extending from the motor 202 supports a drive wheel 247 which in its circumferential surface 248 has a circumferential, wave-shaped groove 249. The flush tube 232 has a coupling element 250 which supports a pin 251 which is fixedly connected to the flush tube 232 and which serves as a follower, and the groove 249 of the drive wheel 247 serves as a guide means.

The drive shaft 246 is via a belt drive 253, between a pulley 252 non-rotatably supported on the drive shaft 246 and a portion 254 on the circumference of the drum 210, connected to the rotary motion of the drum 210.

The pulley 252 and the drum 210 have such a ratio-generating ratio of diameters that the rotary motion of the drum 210 and the reciprocating motion of the flush tube 231 occur out of phase with each other.

A common feature of the described embodiments of the invention is that the reciprocating motion of the spray nozzles 133; 233 has such a stroke B between its end positions, which is so great that that portion of the filter cloth 122; 222 which is flushed by a spray nozzle 133; 233 when the flushing ramp 130; 230 is in the one end position D coincides with that portion of the filter cloth 122; 222 which is flushed by a neighbouring spray nozzle 133'; 233' when the flushing ramp is in the other end position E.

Figure 8:
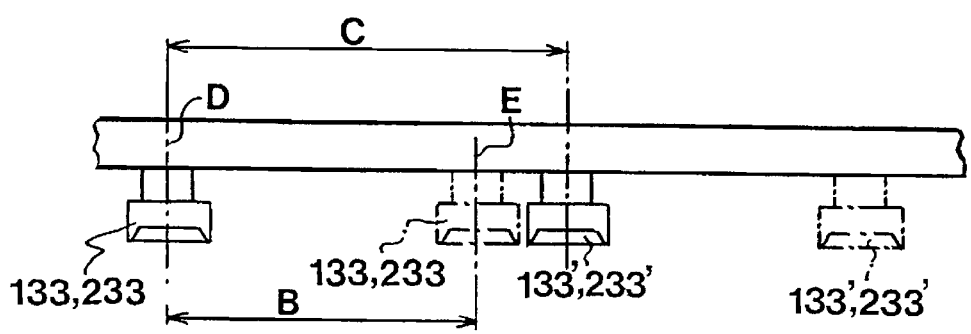
FIG. 8 is a basic sketch which shows the reciprocating motion of the spray nozzles illustrated in FIG. 7.

If the stroke B is equal to the distance C between those portions of the filter cloth 122; 222 which two neighbouring spray nozzles 133, 133'; 233, 233' flush in a certain rotational position of the drum 110; 210 (see FIG. 8), this means that all portions of the filter cloth 122; 222 once in a while is flushed by a spray nozzle 133; 233. A greater overlap in the stroke B causes still more efficient cleaning of the filter cloth.

For the drum filter 200, the motions of the filter cloth 222 and the spray nozzles 233 are perpendicular in relation to each other, the desired stroke B being defined by the reciprocating motion of the spray nozzles 233.

On the other hand, for the disc filter 100 the rotary motion of filter elements 122 cooperate with the oscillating motion of the spray nozzles 133 to provide the relative motion. During the oscillating motion, a certain spray nozzle 133 passes different radii positioned between an innermost and an outermost radius of the filter element 120. The distance between that portion of the filter cloth 122 which is cleaned by said spray nozzle 133 in the innermost position thereof and that portion which is cleaned by said spray nozzle 133 in the outermost position thereof should be at least as great as the distance between those portions which in a certain rotational position of the drum 110 are cleaned by two neighbouring spray nozzles 133, 133'. As a result, the cleaned portions overlap each other. This oscillating stroke means that those portions of the filter cloth 122 which are cleaned by two neighbouring spray nozzles 133, 133' in the respective end positions of the reciprocating motion of the spray nozzles 133, 133' at least touch each other.

It will be appreciated that modifications of the embodiments of the invention described above are conceivable within the scope of the invention, which is defined in the appended claims.

For instance, the belt operation according to the preferred embodiment of the invention in its first aspect can be replaced by other loop-shaped drives, such as a chain drive or the like (not shown).

For the drum filter, the coupling between the rotary motion of the drum and the reciprocating motion of the flush tube can be accomplished by means of an optional transmission which gives an uneven gear ratio since the distance between the drive shaft and the rotary shaft of the drum is constant.

The invention according to these two main aspects has a common, basic function which solves the same basic problems and which gives the same advantages. What differs the above-described aspects of the invention is the constructional features which depend on the type of filtering plant for which the cleaning apparatus is to be used.

What is claimed is:

1. An apparatus for cleaning a filter cloth in a filtering device comprising a filtering device having a drum which is rotatable about its centre axis and which has an inlet for liquid to be filtered and which in its circumferential surface has openings through which the liquid to be filtered is adapted to be conducted in a filtering direction out of the drum for filtering through a filter cloth, and a cleaning device having at least one spray nozzle which is adapted to spray cleaning liquid onto a portion of the filter cloth in a direction opposite to the filtering direction, and a driving device for providing a reciprocating motion to the spray nozzle, the driving device having a coupling for transforming rotary motion of the drum of the filtering device into the reciprocating motion of the spray nozzle of the cleaning device, and the coupling having a ratio such that the rotary motion of the drum and the reciprocating motion of the spray nozzle are out of phase with each other.

2. An apparatus as claimed in claim 1, wherein the reciprocating motion of the spray nozzle has a motion vector component, which is in a plane parallel to that portion of the filter cloth which in a certain rotational position is flushed and which is directed perpendicular to a direction of motion of said filter cloth portion.

3. An apparatus as claimed in claim 1, wherein the spray nozzle is arranged on a flush tube which is adapted to conduct the cleaning liquid to the spray nozzle.

4. An apparatus as claimed in claim 1, wherein the filtering device further includes at least one disc-shaped filter element, whose normal direction is parallel and essentially concentric with the centre axis of the drum, said disc-shaped filter element extending radially away from and round the drum, the filter cloth being supported on at least one lateral surface of the disc-shaped filter element and the cleaning device further includes a flushing ramp for conducting cleaning liquid to the spray nozzle which is pivotable about a pivot axis which is parallel with the centre axis of the drum.

5. An apparatus as claimed in claim 4, wherein the pivotable flushing ramp has at least one flush tube each supporting at least one spray nozzle and being adapted to conduct the cleaning liquid to the spray nozzle.

6. An apparatus as claimed in claim 5, wherein the flush tube extends in a plane which is essentially parallel with the lateral surface of the filter element.

7. An apparatus as claimed in claim 5, wherein the flush tube has such a radial extent as to extend along essentially the entire portion of the lateral surface of the disc-shaped element which is provided with the filter cloth.

8. An apparatus as claimed in any one of claims 4–7, wherein the flushing ramp is connected to a wheel which is eccentrically mounted on a shaft at a distance from the pivot axis of the flushing ramp, and a rotary shaft at the center axis of the drum supports a wheel which is non-rotatably arranged thereon, a loop-shaped drive between the non-rotational wheel and the eccentrically mounted wheel forming said coupling between the rotary motion of the drum and the reciprocating motion of the spray nozzle.

9. An apparatus as claimed in claim 8, wherein the wheels have a ratio-generating ratio of diameters such that the reciprocating motion of the spray nozzle and the rotation of the drum are out of phase with each other.

10. An apparatus as claimed in claim 1, wherein said at least one spray nozzle is arranged on an elongate flushing ramp with a flush tube which is adapted to conduct cleaning liquid to the spray nozzle and which is arranged essentially parallel with the centre axis of the drum.

11. An apparatus as claimed in claim 10, wherein the flush tube is reciprocable along its longitudinal axis.

12. An apparatus as claimed in claim 10, wherein a drive wheel is arranged on a drive shaft which via said coupling rotationally drives the drum, the drive wheel having on its circumferential surface a circumferential guide means, a follower means being connected to the flush tube and the follower means engaging with and following the guide means to provide said reciprocating motion.

13. An apparatus as claimed in claim 12, wherein the guide means comprises a wave-shaped groove in the circumferential surface of the drive wheel.

14. An apparatus as claimed in claim 12, wherein the follower means comprises a pin fixedly connected to the flush tube.

15. An apparatus as claimed in any one of claims 12–14, wherein the drive shaft which supports the drive wheel is connected to a rotary shaft at the center axis of the drum with a ratio such that the rotation of the drum and the reciprocating motion of the spray nozzle are out of phase with each other.

16. An apparatus as claimed in claim 1, which comprises at least two spray nozzles, two neighbouring spray nozzles being arranged to spray, in a certain rotational position of the drum, cleaning liquid onto a first and a second portion of the filter cloth, the reciprocating motion of the spray nozzles having a stroke which is at least equal to the distance between said first and second portion of the filter cloth.

\* \* \* \* \*